(12) United States Patent
Gan et al.

(10) Patent No.: US 11,304,053 B2
(45) Date of Patent: Apr. 12, 2022

(54) METHODS AND APPARATUSES FOR SUPPORTING DATA OFF EXEMPT SERVICES IN A COMMUNICATION SYSTEM

(71) Applicant: Telefonaktiebolaget LM Ericsson (publ), Stockholm (SE)

(72) Inventors: Juying Gan, Shanghai (CN); George Foti, Dollard des Ormeaux (CA); Angel Navas Cornejo, Leganes (ES); Shabnam Sultana, Montreal (CA); Jinyin Zhu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/494,099

(22) PCT Filed: Mar. 13, 2018

(86) PCT No.: PCT/CN2018/078809
§ 371 (c)(1),
(2) Date: Sep. 13, 2019

(87) PCT Pub. No.: WO2018/166437
PCT Pub. Date: Sep. 20, 2018

(65) Prior Publication Data
US 2020/0221286 A1 Jul. 9, 2020

(30) Foreign Application Priority Data

Mar. 13, 2017 (WO) ................ PCT/CN2017/076501
Jan. 19, 2018 (WO) ................ PCT/CN2018/073470

(51) Int. Cl.
*H04W 8/20* (2009.01)
*H04L 67/14* (2022.01)
(Continued)

(52) U.S. Cl.
CPC ............... *H04W 8/20* (2013.01); *H04L 67/14* (2013.01); *H04W 8/08* (2013.01); *H04W 8/24* (2013.01);
(Continued)

(58) Field of Classification Search
CPC ........... H04W 8/02; H04W 8/04; H04W 8/08; H04W 8/20; H04W 8/205; H04W 8/24; H04W 8/245; H04W 60/005; H04L 67/14
See application file for complete search history.

(56) References Cited

U.S. PATENT DOCUMENTS 9,351,269 B2    5/2016  Meng et al.
2018/0368050 A1* 12/2018  Chun ................ H04W 36/0022
2019/0357090 A1* 11/2019  Drevon .................... H04W 4/24

FOREIGN PATENT DOCUMENTS

CN    101742453 A    6/2010
JP    2016521505 A    7/2016
(Continued)

OTHER PUBLICATIONS

Intel et al. "Introduction of 3GPP PS Data Off" SA WG2 Meeting #118, S2-166847, Nov. 14-18, 2016, Reno, Nevada, 13 pages.
(Continued)

*Primary Examiner* — Pao Sinkantarakorn
(74) *Attorney, Agent, or Firm* — Rothwell, Figg, Ernst & Manbeck, P.C.

(57) ABSTRACT

The present disclosure proposes a method of a policy controlling device in a communication network, for supporting Public Land Mobile Network (PLMN) specific 3GPP Data Off Exempt Services (DOES), the method comprises providing one or more uplink filters associated with a PLMN specific list of 3GPP DOES to a terminal device in the communication network. According to various aspects and embodiments of the method, per PLMN 3GPP DOES may
(Continued)

be supported with a simplified scheme, and/or impact to existing network can be reduced.

16 Claims, 7 Drawing Sheets

(51) Int. Cl.
| | | |
|---|---|---|
| *H04W 8/08* | (2009.01) | |
| *H04W 8/24* | (2009.01) | |
| *H04W 48/18* | (2009.01) | |
| *H04W 60/00* | (2009.01) | |
| *H04W 88/14* | (2009.01) | |
| *H04W 88/16* | (2009.01) | |

(52) U.S. Cl.
CPC ......... *H04W 48/18* (2013.01); *H04W 60/005* (2013.01); *H04W 88/14* (2013.01); *H04W 88/16* (2013.01)

(56) References Cited

FOREIGN PATENT DOCUMENTS

| WO | 2011060974 A1 | 5/2011 | |
|---|---|---|---|
| WO | 2014048331 A1 | 4/2014 | |
| WO | WO-2015158363 A1 * | 10/2015 | ............ H04W 8/205 |

OTHER PUBLICATIONS

Nokia et al. "Data Off evaluation and way forward" SA WG2 Meeting #117, S2-165951, Oct. 17-21, 2016, Kaohsiung City, Taiwan, 8 pages.
International Search Report and the Written Opinion of the International Searching Authority, issued in corresponding International Application No. PCT/CN2018/078809, dated May 30, 2018, 11 pages.
International Preliminary Report on Patentability, issued in corresponding International Application No. PCT/CN2018/078809, dated Jul. 19, 2019, 14 pages.
Orange, Huawei "Solution for Key issues 2 and 3" SA WG2 Meeting #116BIS, S2-164685, Aug. 29-Sep. 2, 2016, Sanya, P. R China, 5 pages.
Ericsson "EPC Handling of Non-IMS Exempt Services Data Off Phase 2" SA WG2 Meeting #120, S2-171675, Mar. 31, 2017 (Feb. 27-31, Busan, Korea, 22 pages.
Nokia et al. "Providing the UE with a per PLMN list of PS Data Off exempted services" SA WG2 Meeting #120, S2-171779, Mar. 31, 2017 (Mar. 27-31, 2017, Busan, South Korea), 19 pages.
3GPP, 3rd Generation Partnership Project; Technical Specification Group Services and System Aspects; Service accessibility (Release 14), 3GPP TS 22.011, V14.4.0 (Dec. 2016), 30 pages.
3GPP, 3rd Generation Partnership Project; Technical Specification Group Services and System Aspects; General Packet Radio Service (GPRS); Service description; Stage 2 (Release 14), 3GPP TS 23.060, V14.3.0 (Mar. 2017), 367 pages.
3GPP, 3rd Generation Partnership Project; Technical Specification Group Services and System Aspects; Policy and charging control architecture (Release 14), 3GPP TS 23.203, V14.3.0 (Mar. 2017), 256 pages.
3GPP, 3rd Generation Partnership Project; Technical Specification Group Services and System Aspects; General Packet Radio Service (GPRS) enhancements for Evolved Universal Terrestrial Radio Access Network (E-UTRAN) access; (Release 14), 3GPP TS 23.401, V14.2.0 (Dec. 2016), 385 pages.
3GPP, 3rd Generation Partnership Project; Technical Specification Group Services and System Aspects; Study on 3GPP PS Data Off (Release 14), 3GPP TR 23.702, V14.0.0 (Dec. 2016), 62 pages.
Ericsson, "Update to Solution 2.3" 3GPP TSG-SA WG2 Meeting #117, S2-165517, Oct. 17-21, 2016, Kaohsiung, Taiwan, 6 pages.

\* cited by examiner

METHODS AND APPARATUSES FOR SUPPORTING DATA OFF EXEMPT SERVICES IN A COMMUNICATION SYSTEM

CROSS REFERENCE TO RELATED APPLICATION(S)

This application is a 35 U.S.C. § 371 National Phase Entry Application from PCT/CN2018/078809, filed Mar. 13, 2018, designating the United States, and also claims the benefit of International Application No. PCT/CN2018/073470, filed Jan. 19, 2018, and International Application No. PCT/CN2017/076501, filed Mar. 13, 2017, the disclosures of which are incorporated herein by reference in their entirety.

TECHNICAL FIELD

The non-limiting and example embodiments of the present disclosure generally relate to a technical field of communication network, and specifically to methods, apparatuses and computer programs for supporting third generation partnership project (3GPP) Data Off Exempt Services in a communication system.

BACKGROUND

This section introduces aspects that may facilitate a better understanding of the disclosure. Accordingly, the statements of this section are to be read in this light and are not to be understood as admissions about what is in the prior art or what is not in the prior art.

In a wireless system, it is desirable to provide various services in order to satisfy different requirements from users. Some users may want to disable Packet Switched (PS) data service for a certain time period to save money, and a PS Data Off feature has been introduced in the 3GPP to meet such a requirement.

The 3GPP PS Data Off feature, when activated by the user, prevents transport of all Internet Protocol (IP) packets except IP packets required by 3GPP PS Data Off Exempt Services (3GPP DOES) via Packet Data Connection (PDN) connections in 3GPP access networks. In 3GPP Long Term Evolution (LTE) Release 14 (Rel-14), a Data Off solution has been specified to support a common list of 3GPP DOES for all PLMNs, and details can be found, for example, in 3GPP TS23.401 v14.2.0, TS23.060 v14.2.0 and TS 23.203 v14.2.0. The Data Off solution specified in Rel-14 solution is also known as a Phase 1 Data Off solution.

During study phase of LTE Release 15 (Rel-15), a high level solution to address the requirement for supporting per PLMN 3GPP DOES has been proposed, that is, a wireless system shall provide a mechanism by which an operator can configure the list of 3GPP DOES on per PLMN basis in HSS. However, the proposed solution is not well investigated.

The proposed solution for 3GPP Rel-15 is to configure the 3GPP DOES by the Home Subscriber Server (HSS), and a further investigation shows that it incurs extensive impact on existing network procedures and scenarios and may require new procedure to be introduced. In addition, it may add much complexity in an interworking scenario with different Data Off capabilities.

SUMMARY

In order to support PLMN specific 3GPP DOES in an efficient way, methods, apparatuses and computer programs are provided in the present disclosure. It will be appreciated that embodiments of the present disclosure could be widely applied to any wireless communication system where similar problems exist.

Various embodiments of the present disclosure mainly aim at providing methods, apparatuses and computer programs for providing PLMN specific 3GPP DOES. Other features and advantages of embodiments of the present disclosure will be understood from the following description of specific embodiments when read in conjunction with the accompanying drawings, which illustrate, by way of example, the principles of embodiments of the present disclosure.

In a first aspect of the disclosure, there is provided a method of a policy controlling device in a communication network, for supporting Public Land Mobile Network (PLMN) specific 3GPP Data Off Exempt Services (DOES), the method comprising providing one or more uplink filters associated with a PLMN specific list of 3GPP DOES to a terminal device in the communication network. The method may further comprise obtaining the list, e.g., by configuration of the list in the policy controlling device or by fetching the list from a repository. In some embodiments, said providing in the method is implemented via a session management device and a mobility management device during one or more of: a registration procedure of the terminal device, a session establishment procedure initiated by the terminal device, and a session modification procedure initiated by the policy controlling device. In other embodiments, the policy controlling device is a PCF, and said providing is implemented via an AMF through an interface between the PCF and the AMF during one or more of: a registration procedure of the terminal device, and a UE configuration update procedure initiated by the PCF.

In a second aspect of the disclosure, there is provided a policy controlling device in a communication network, for supporting Public Land Mobile Network (PLMN) specific 3GPP Data Off Exempt Services (DOES), the policy controlling device comprising a providing unit for providing one or more uplink filters associated with a PLMN specific list of 3GPP DOES to a terminal device in the communication network. The policy controlling device may further comprise a obtaining unit for obtaining the list, e.g., by configuration of the list in the policy controlling device or by fetching the list from a repository. In some embodiments, said providing is implemented via a session management device and a mobility management device during one or more of: a registration procedure of the terminal device, a session establishment procedure initiated by the terminal device, and a session modification procedure initiated by the policy controlling device. In other embodiments, the policy controlling device is a PCF, and said providing is implemented via an AMF through an interface between the PCF and the AMF during one or more of: a registration procedure of the terminal device, and a UE configuration update procedure initiated by the PCF.

In a third aspect of the disclosure, there is provided a policy controlling device, comprising a processor, and a memory, having stored instructions that when executed by the processor cause the policy controlling device to perform the above method.

According to various aspects and embodiments as mentioned above, per PLMN 3GPP DOES may be supported with a simplified scheme, and/or impact to existing network can be reduced.

BRIEF DESCRIPTION OF THE DRAWINGS

The above and other aspects, features, and benefits of various embodiments of the present disclosure will become more fully apparent from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components and the like, but do not preclude the presence or addition of one or more other features, elements, components and/or combinations thereof.

Unless defined otherwise, all technical and scientific terms used herein have the same meaning as commonly understood by one of ordinary skills in the art to which this disclosure belongs.

As used herein, the term "communication network" refers to a network following any suitable communication standards currently known, such as LTE-Advanced (LTE-A), LTE, Wideband Code Division Multiple Access (WCDMA), High-Speed Packet Access (HSPA), Wireless Local Area Network (WLAN), Internet Protocol (IP) and so on, and/or any other protocols e to be developed in the future.

As used herein, the term "network device" refers to a device in a communication network via which a terminal device accesses the network and/or receives services therefrom. The network device may include, but not limited to, a router, a server, a controlling entity/function/device, a gateway, and the like. More generally, however, network device may represent any suitable device (or group of devices) capable, configured, arranged, and/or operable to enable and/or provide a terminal device access to the communication network or to provide some service to a terminal device that has accessed the communication network.

The term "terminal device" refers to any end device that can access a communication network and receive services therefrom. By way of example and not limitation, a terminal device may be referred to as user equipment (UE), a Subscriber Station (SS), a Portable Subscriber Station, a Mobile Station (MS), or an Access Terminal (AT). The terminal device may include, but not limited to, a mobile phone, a cellular phone, a smart phone, a tablet, a wearable device, a personal digital assistant (PDA), a personal computer (PC), a portable computer, image capture terminal devices such as digital cameras, gaming terminal devices, music storage and playback appliances, wearable terminal devices, vehicle-mounted wireless terminal devices and the like. In the following description, the terms "terminal device", "terminal", "user equipment" and "UE" may be used interchangeably.

As one specific example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The terminal device may support device-to-device (D2D) communication, for example by implementing a 3GPP standard for side-link communication, and may in this case be referred to as a D2D communication device.

Figure 1:
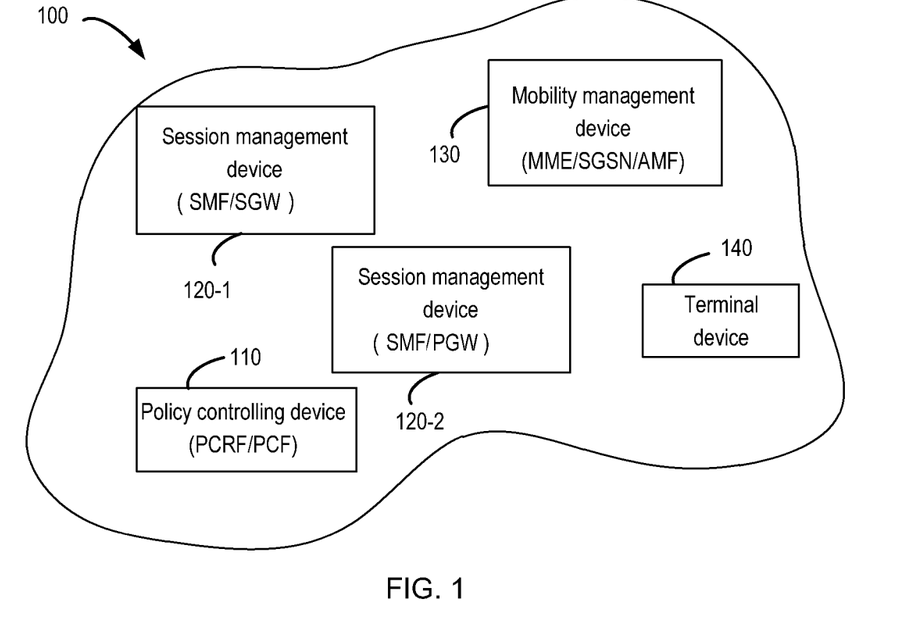
FIG. 1 illustrates an example communication network in which embodiments of the present disclosure may be implemented.

FIG. 1 illustrates an example communication network 100 in which embodiments of the disclosure may be implemented. As shown in FIG. 1, the communication network 100 includes one or more policy controlling devices 110 including for example, but not limited to, a Policy Control Function (PCF) or a Policy Control and Routing Function (PCRF), one or more session management devices 120-1, 120-2 (collectively referred to as "session management device(s)"120) including for example, but not limited to, a Session Management Function (SMF), a Serving Gateway (SGW), or a PDN Gateway (PGW), one or more mobility management devices 130 including for example, but not limited to, an Access and Management Function (AMF), a Mobility Management Element (MME) or a Serving Gateway Serving Node (SGSN), and one or more terminal devices 140 including for example, but not limited to, a mobile phone.

The terminal device 140 may access the communication network 100 (for example, transmitting data to the network in uplink and/or receiving data from the network in downlink) via a wireless communication mechanism such as any suitable radio access technology (RAT). The network devices 110-130 may communicate according to any suitable communication protocol, and embodiments are not limited to any specific way for communicating between network devices. It should be appreciated that the communication network 100 is presented just for illustration purpose, and in another example, the communication network may include more or less or different network devices depending on architecture and technique adopted by the network.

The communication network 100 may provide circuit-switched (CS) and/or packet switched (PS) services to a terminal device within its coverage. For some reason, a user of a terminal device may not want to send or receive PS data services at least for a certain time period, and therefore, the user may activate the Data Off feature, i.e. the 3GPP PS Data Off feature. In this case, transport of all IP packets via PDN connections in 3GPP access networks is prevented, except IP packets required by 3GPP PS Data Off Exempt Services (3GPP DOES).

The Data Off solution specified in 3GPP LTE Rel-14, also referred to as a Phase 1 Data Off solution herein, only supports a common list of 3GPP DOES for all PLMN. That is, the 3GPP Data Off Exempt Services supported by all the PLMN operators are same. The Phase 1 Data Off solution may be insufficient and a requirement for an enhanced Phase 2 Data Off solution supporting per PLMN 3GPP DOES has arisen.

According to 3GPP TS 22.011 v14.4.0, the 3GPP Rel-15 system shall provide a mechanism by which an operator can configure which operator services are defined as 3GPP PS DOES. When the 3GPP PS Data Off feature is activated in UE, in order to preserve charging consistency, the UE shall inform the network that feature of 3GPP PS data Off is activated and cease sending uplink IP Packets of all services except the 3GPP PS DOES, and correspondingly, the network shall cease sending downlink IP Packets to the UE for all services except the 3GPP PS DOES. Note that disabling of IP Packets on both uplink and downlink is needed in order to provide consistency of charging between HPLMN and Visited PLMN (VPLMN), as well as consistency between what the user expects and what the user may be billed for. Per 3GPP TS 22.011 v14.4.0, the 3GPP PS Data Off feature may be activated based on roaming status.

It is also specified in TS 22.011 v14.4.0 that each of the following services shall be configurable on a per PLMN basis to be part of the 3GPP PS DOES: Multi Media Telephony (MMTel) Voice, Short Messaging Service (SMS) over IP Multimedia Subsystem (IMS), unstructured supplementary service data (USSD) over IMS (USSI), MMTel Video, Device Management over PS, IMS Supplementary Service configuration via the Ut interface using Extensible Markup Language (XML) Configuration Access Protocol (XCAP), and particular IMS services not defined by 3GPP, each of which being identified by an IMS communication service identifier. The system may support falling back to operating over a CS domain in case an operator service is not configured to be 3GPP PS DOES and an equivalent CS domain operator service exists.

Further, according to TS 22.011 v14.4.0, the user should be made aware of the operator services that belong to 3GPP PS Data Off Exempt Services. To address the requirement of "operator services shall be configurable by the HPLMN operator on a per PLMN basis to be part of the 3GPP PS Data Off Exempt Services" as specified in chapter 2.1.1 of 3GPP TS 22.011 v14.4.0, a solution has been proposed in chapter 8 of 3GPP Technical Report TR23.702 v14.0.0, which requires that the list of 3GPP PS DOES be configured by a Home Subscriber Server (HSS) and the configuration will take precedence over a PGW/PCRF configuration. Some descriptions of the solution recited in TR23.702 v14.0.0 is reproduced in the following table:

TABLE 1

In Rel-15, the PGW/GGSN may be pre-configured with the list of PS Data Off exempted APNs and associated filters, based e.g. on static operators roaming agreements when possible. For the case when detailed roaming agreements cannot apply or when the home operator wants to dynamically control the PS Data Off exempted APNs and associated filters in a VPLMN, the following additional feature is adopted for normative specification work to satisfy the Local Break Out roaming case requirement where the list of non-SIP services for a VPLMN is controlled by the HPLMN:
For downlink, the list of PS Data Off exempted APNs and associated filters are sent from the HSS to the MME/SGSN during Attach/TAU/RAU procedure (or using Insert Subscriber Data when the list is modified by the operator), and then PS Data Off related information is sent from the MME/SGSN to the PGW/GGSN in the Create Session Request message during the PDN connection establishment for new PDN connections, or in the Modify Bearer Request for established PDN connections.
If the PGW/PCRF or GGSN has been pre-configured with the list of PS Data Off exempted APNs and associated filters, based e.g. on operators roaming agreements and receives PS Data Off related information from the MME, the information received from the MME takes precedence over the pre-configured list.

According to current solution specified in chapter 8 of 3GPP Technical Report TR23.702 v14.0.0, the list of 3GPP PS DOES is to be configured by the HSS, and inventors of the present disclosure have observed that such solution has some drawbacks. For example, it has extensive impact on existing procedures and scenarios of the network, and it may need new procedure, for example, during HSS Initiated Subscribed Data Change on list of 3GPP DOES. In addition, it adds much complexity in an interworking scenario with different Data Off capabilities.

In order to solve at least part of the above problems, methods, apparatuses and computer programs have been proposed herein. Some embodiments of the present disclosure provide a PCRF based Data Off solution, according to which, the PLMN specific list of 3GPP DOES may be configured in the PCRF, or configured in a Subscriber Profile Repository (SPR) and then provisioned to the PCRF. In some embodiments, one or more uplink filters associated with the list of 3GPP DOES may be sent to UE during initial attachment, session establishment or session modification, so that the UE can use the UL filters to permit sending uplink packets for services belonging to the list of 3GPP DOES when the Data Off feature is activated. With some embodiments of the present disclosure, impacts on the existing network may be minimized or reduced. In an embodiment, an impact on a visiting network may be avoided.

Now, the embodiments will be described in connection with several procedures in the communication network, however it can be understood that, the embodiments can be applied in any situation where one or more uplink filters associated with a PLMN specific list of 3GPP DOES is/are needed to be provided to a terminal device.

I. Embodiments in Registration Procedure

Figure 2A:
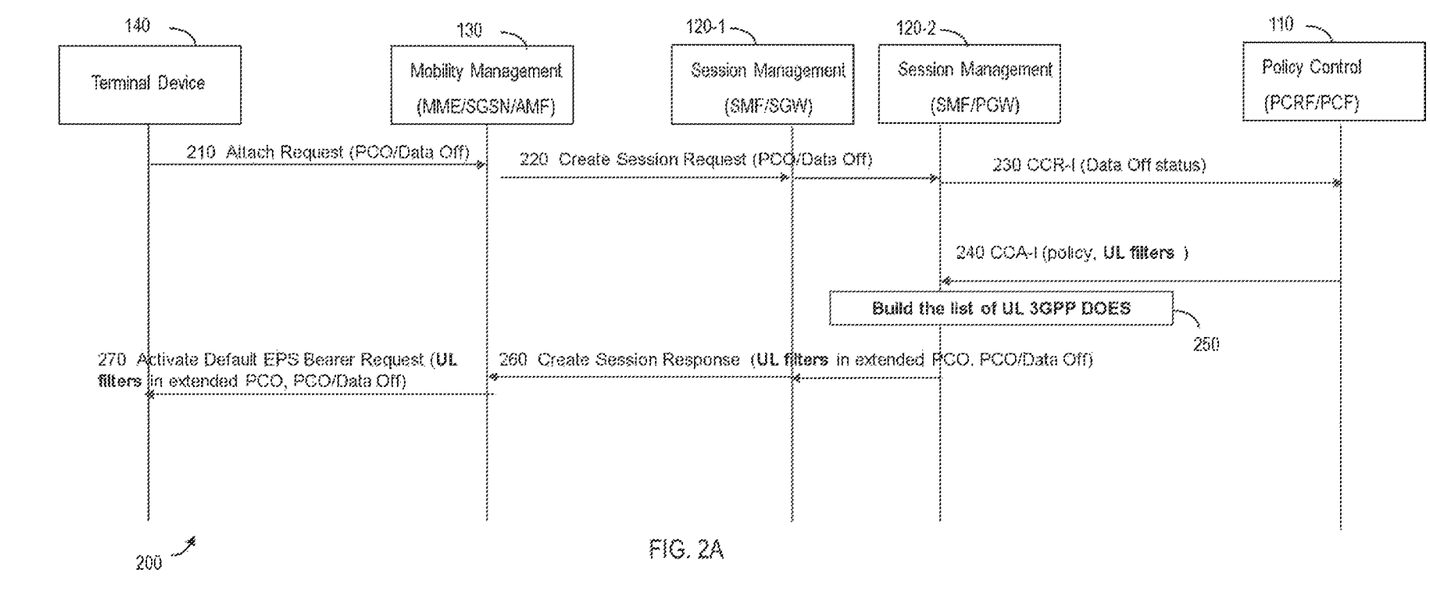
FIGS. 2A-2D illustrate procedures during which uplink filters associated with PLMN specific 3GPP DOES may be indicated to a terminal device from a policy controlling device according to embodiments of the present disclosure.

Reference is now made to FIG. 2A which shows an example embodiment 200 for supporting PLMN specific 3GPP DOES. The example embodiment shown in FIG. 2A may be used in registration of a terminal device, such as, initial attach of a terminal device in an Evolved Packet System (EPS). For simplicity, the example embodiment will be described with reference to the policy controlling devices 110, the session management devices 120 including the SGW 120-1 and the PGW 120-2, the mobility management devices 130, and the terminal devices 140, as shown in FIG. 1. However, it is to be understood that embodiments are not limited thereto. More or less or different network devices with similar functionalities may be used in other embodiments depending on architecture and technique adopted in the communication network.

In this example, for sake of discussions, it is assumed that the policy controlling devices 110, for example a PCRF, is deployed in the network, and the PLMN specific list of 3GPP DOES is configured in the PCRF, or configured in a SPR and then provisioned to PCRF.

As shown in FIG. 2A, the terminal device 140 transmits 210 an Attach Request including information on Protocol Configuration Options (PCO) or Data Off capability to the mobility management devices 130, for example an MME. The MME 130 transmits 220 a Create Session Request including the information on PCO or Data Off capability to the PGW 120-2 via the SGW 120-1. At, the PGW 120-2 sends 230 a Credit Control Request-Initiate (CCR-I) including information on Data Off status to the policy controlling devices 110, for example the PCRF. In some embodiments, the above operations of 210-230 may be same as that specified in current 3GPP standard (for example, sub-clause 5.3.2.1 of 3GPP TS 23.401 v14.2.0) for initial attach of UE.

In this example the PCRF 110 sends 240 to the PGW 120-2 a Credit Control Answer-Initiate (CCA-I) including new information such as a new Attribute Value Pair (AVP) for indicating one or more uplink filters associated with the PLMN specific list of 3GPP DOES configured/provisioned in the PCRF 110. Besides information on the uplink filter(s), the CCA-I may also include other conventional AVP(s) such as an AVP for indicating different policy. The PGW 120-2 may build 250 the list of 3GPP DOES based on the received uplink filter(s). The PGW 120-2 sends 260 a Create Session Response to the MME 130 via the SGW 120-1 and the information on the uplink filter(s) is incorporated in the Create Session Response e.g., as a new container in an existing Information Element (IE), e.g., in an extended PCO IE. Note that, in some embodiments, the Create Session Response may also include conventional information on PCO or Data Off status. The MME 130 sends 270 the uplink filter(s) to the terminal device 140 by using an Activate Default EPS Bearer Request in which the information on the uplink filter(s) is incorporated e.g., as a new container in existing IE, e.g., in an extended PCO IE. Likewise, in some embodiments, the Activate Default EPS Bearer Request may include other information such as information on PCO or Data Off status.

In this example, an existing IE is enhanced to carry information on the UL filter(s). As a new container in an existing IE is transparent to a visiting network, no additional impact is expected on the visiting network due to the enhancement. In addition, the uplink filter(s) transmitted 270 to the terminal device 140 enables the terminal device 140 to permit sending uplink packets for services belonging to the PLMN specific list of 3GPP DOES when the Data Off feature is activated.

Figure 2B:
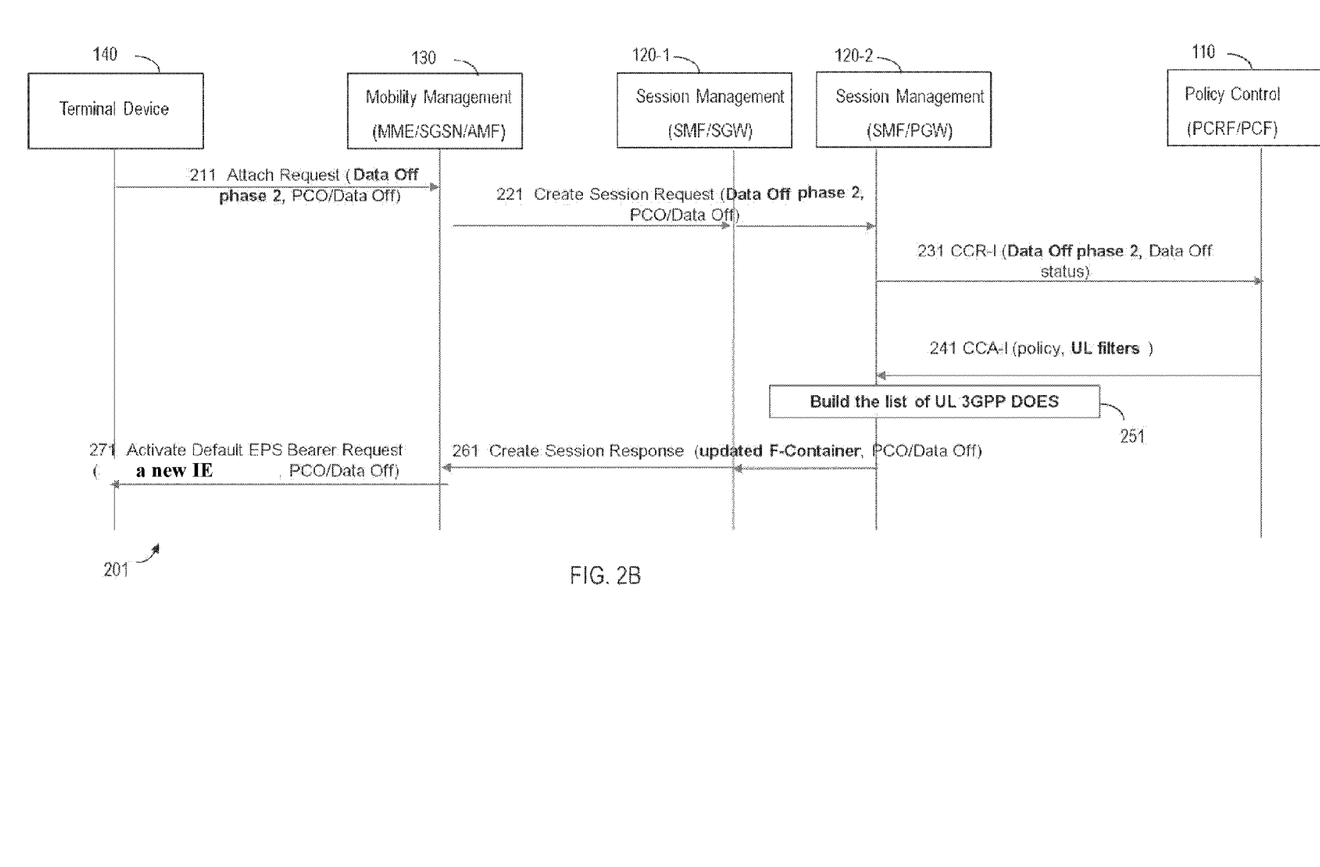

Another example embodiment 201 for supporting PLMN specific 3GPP DOES is shown in FIG. 2B, which may also be used in registration of a terminal device, such as, initial attach of a terminal device in an EPS. For simplicity, the example embodiment 201 will also be described with reference to the policy controlling devices 110, the session management devices 120 including the SGW 120-1 and the PGW 120-2, the mobility management devices 130 and the terminal devices 140 shown in FIG. 1; however, it should be appreciated that more or less or different network devices with similar functionalities may be used in other embodiments depending on architecture and technique adopted in the communication network.

In this example, it is also assumed that the PLMN specific list of 3GPP DOES is configured in the PCRF 110, or configured in a SPR and then provisioned to PCRF 110.

The embodiment 201 shown in FIG. 2B involves same signaling as that shown in FIG. 2A, but content included in these signaling is different. In particular, the Attach Request sent 211 by the terminal device 140 to the MME 130 may include information on Data Off phase 2 capability (that is, whether the terminal device supports PLMN specific 3GPP DOES or not) of the terminal device 140 which may indicate whether the terminal device support the PLMN specific 3GPP DOES or not. The MME 130 may include information on its own Data Off phase 2 capability along with the terminal device's Data Off phase 2 capability into the Create Session Request and sends 221 it to the PGW 120-2 via the SGW 120-1. In response, the PGW 120-2 sends 231 a CCR-I including information on its own Data Off phase 2 capability along with the Data Off phase 2 capability of the terminal device 140 and the MME 130 to the policy controlling devices 110, for example the PCRF.

In this example, if the PCRF detected that all of the terminal device 140, and the MME 130 and the PGW 120-2 support PLMN specific 3GPP DOES, it sends 241, to the PGW 120-2, a CCA-I including new information such as a new AVP for indicating one or more uplink filters associated with the PLMN specific list of 3GPP DOES configured/ provisioned in the PCRF 110. Similar to FIG. 2A, the PGW 120-2 may build 251 the list for 3GPP DOES and sends one or more uplink filters associated with the list to MME 130. The PGW 120-2 sends 261 a Create Session Response to the MME 130 via the SGW 120-1. Different from the example shown in FIG. 2A, the information on the uplink filter(s) is incorporated in the Create Session Response e.g., as a new container in an existing IE, e.g., in a F-Container IE. The MME 130 extracts the information on the uplink filters from the F-Container and includes it into an Activate Default EPS Bearer Request as a new IE in FIG. 2B, and sends 271 the Activate Default EPS Bearer Request to the terminal device 140.

The embodiment shown in FIG. 2B provides an alternative way for indicating the uplink filter(s) to the terminal device 140 from the PCRF 110. In this example, existing IE over GPRS Tunneling Protocol (GTP) v2 is extended and new container IE over Non-Access Stratum (NAS) is introduced to carry the UL filter(s). In addition, this alternative solution may require UE, MME, and PGW to report its own Phase 2 Data Off capability.

Similar to the example described with reference to FIG. 2A, the signaling involved in FIG. 2B may also include other information, for example, for support conventional operations. Furthermore, it should be appreciated that, depending on network technique being used, terminologies of the involved network devices and/or signaling may be different in some other embodiments.

II. Embodiments in Session Establishment Procedure

Alternatively, or in addition, the uplink filter(s) associated with the PLMN specific 3GPP DOES may be signaled from the PCRF 110 to the terminal device 140 during one or more other procedures than the registration procedure shown in FIGS. 2A-2B, for example, during a session establishment procedure, such as, a UE requested PDN connectivity procedure specified in sub-clause 5.10.2 of 3GPP TS23.401, and it allows the UE to request for connectivity to an additional PDN. In some embodiments, the uplink filter(s) associated the PLMN specific 3GPP DOES may be indicated to the terminal device 140 during this procedure. For example, same operations as 220-270 shown in FIG. 2A or 221-271 shown in FIG. 2B may be used in a session establishment procedure for indicating the uplink filter(s) to the terminal device 140.

III. Embodiments in Session Modification Procedure

In another embodiment, the uplink filter(s) may be indicated to the terminal device 140, alternatively or in addition, during a session modification procedure, e.g., a PCRF initiated Internet Protocol-Connectivity Access Network (IP-CAN) session modification procedure, for example the PCRF initiated IP-CAN session modification procedure specified in Sub-clauses 5.4.2 and 5.4.3 of 3GPP TS23.401. This procedure may be triggered, for example, when there is a change in the PLMN specific list of 3GPP DOES or a change of the associated uplink filter(s) in PCRF 110. Depending on how the UL filters are to be carried, two options are proposed and illustrated schematically in FIGS. 2C and 2D.

Figure 2C:
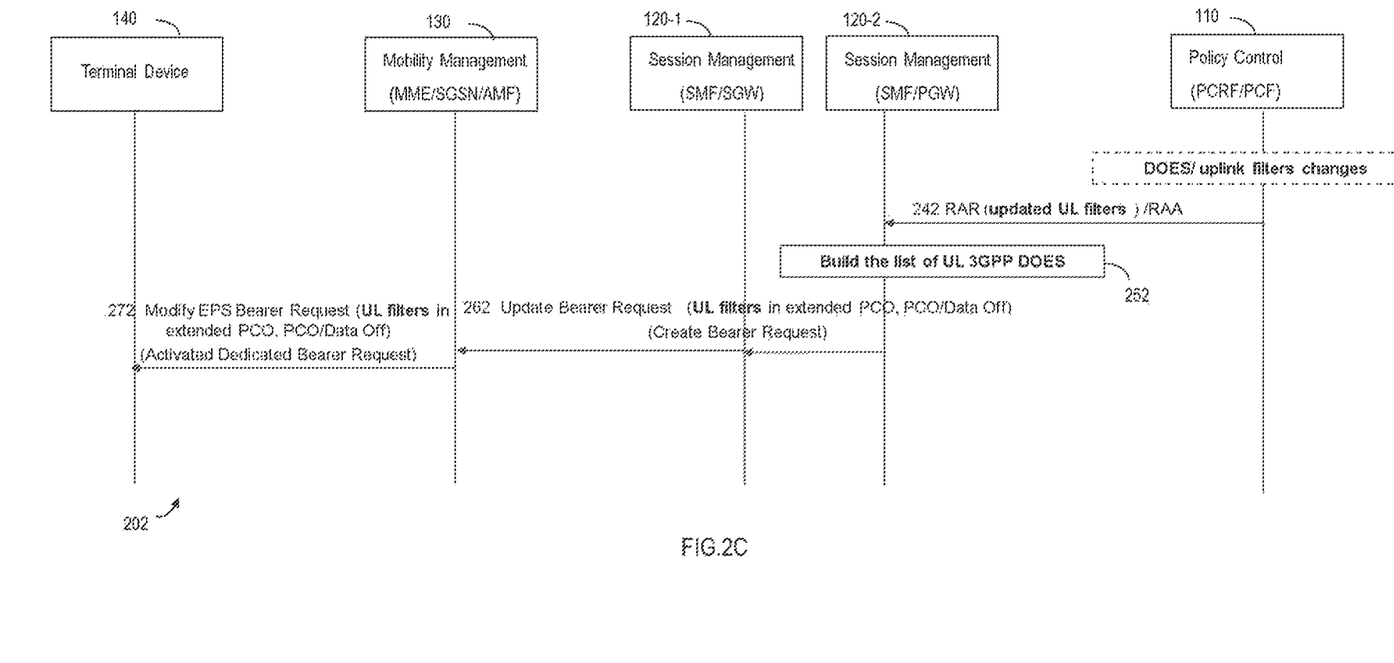

In the example embodiment 202 shown in FIG. 2C, in response to a change of the uplink filters, the PCRF 110 sends 242 a RAR or RAA to the PGW 120-2 with information on the uplink filter(s) included. In response to the RAR including the information on the uplink filter(s), the PGW 120-2 may build 252 list of uplink filters for 3GPP DOES to MME via SGW. The PGW 120-2 includes the information on the uplink filter(s) in an Updated Bearer Request (or a Create Bearer Request) e.g., as a new container in an existing IE, e.g., in an extended PCO and sends 262 the Updated Bearer Request via the GW 120-1 to the MME 130. The MME forwards the uplink filter(s) by sending 272 the extended PCO with the information on the uplink filter(s) transparently to the terminal device 140 using a Modify EPS Bearer Request (or an Activated Dedicated Bearer Request).

Figure 2D:
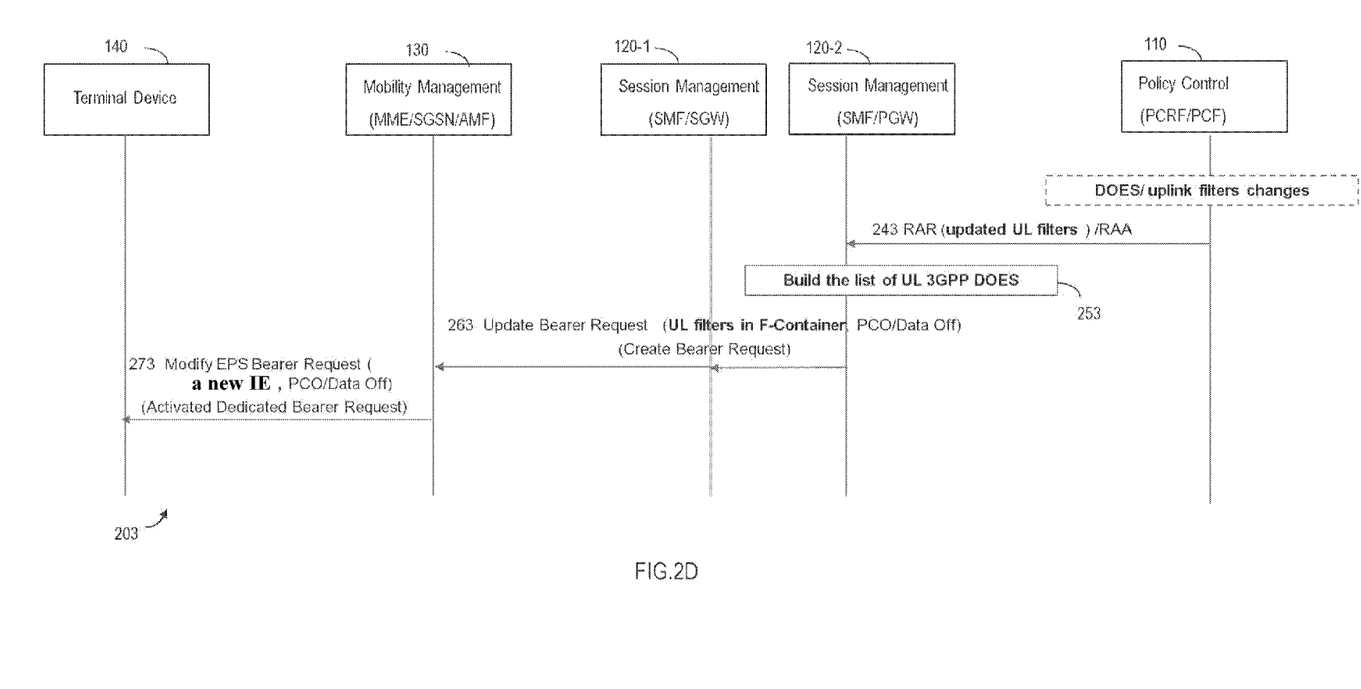

In the example embodiment 203 shown in FIG. 2D, similar signaling messages to that shown in FIG. 2C are used, and the embodiment 203 differs from 202 in that information on the uplink filter(s) is carried in different IEs of the Update Bearer Request (or Create Bearer Request) and Modify EP Bearer Request (or Activated Dedicated Bearer Request). In particular, in the Update Bearer Request (or Create Bearer Request) sent 263 from the PGW 120-2 to the MME 130, the information on the uplink filter(s) is carried e.g., in a new container in an existing IE, e.g., in a F-Container IE. Furthermore, in the Modify EPS Bearer Request (or Activated Dedicated Bearer Request) sent 273 from the MME 130 to the terminal device 140, the information on the uplink filter(s) is carried in a new IE in FIG. 2D. Note that, an Update Bearer Request or alternatively a Create Bearer Request may be used for the sending 263 based on needs. For example, if the policy update is initiated by the PCRF 110 in response to a change of UL filters, the PGW 120-2 may send 263 the Update Bearer Request including the changed UL filters to the MME 130. In another embodiment, in addition to the changed UL filters, the PCRF 110 may indicate change of Quality of Service (QoS) for a certain service to the PGW 120-2, and the PGW 120-2 may send 263 a Create Bearer Request to the MME 140.

It is to be understood that the signaling messages shown in FIGS. 2C-2D may include further information, for example for conventional operations. Furthermore, it is to be understood that depending on network technique being used, terminologies of the involved network devices and/or signaling may be different in some other embodiments. For example, if the proposed mechanism is applied in conjunction with the second generation (2G) or third generation (3G) access technique, the UL filter(s) may need to be carried in a GPRS Tunneling Protocol (GTP) v1 message and a NAS message over 2G/3G radio. In other embodiments where the proposed mechanism is applied in the above procedures in a 5G system, the User Data Repository (UDR) may be used to replace SPR, the Policy Control Function (PCF) may be used to replace the PCRF, the Access and Management Function (AMF) may be used to replace the SGSN/MME, the Session Management Function (SMF) may be used to replace the SGW/PGW, and the User Data Management (UDM) may be used to replace a HSS or HLR.

IV. Further Embodiment in Registration Procedure for 5G

As described above, the above embodiments regarding FIG. 2A and FIG. 2B can also be applied in the registration procedure of 5G system. In addition to those embodiments, a further embodiment can also be applied in the registration procedure of 5G system, in view of the particulars of the registration procedure of 5G system.

Referring back to FIG. 2A, for the registration procedure of 5G system, after the terminal device 140 transmits 210 a registration request to the AMF 130, the AMF 130 may first directly contact with the PCF 110 to request some policies from the PCF 110 through an interface (i.e., N15 interface) between the AMF 130 and the PCF 110, before or without contacting 220 with the SMF 120. In this further embodiment, the PCF 110 is enhanced so that the PCF 110 can, e.g., by using a new IE, provide information indicating one or more uplink filters associated with the PLMN specific list of 3GPP DOES in the PCF 110 along with the policies to the AMF 130 through said interface, when the policies are requested by the AMF 130. Then, the information on the uplink filter(s) may be passed to the terminal device 140 by the AMF 130 in step 270, e.g., in a new container in an existing IE or a new IE.

V. Embodiment in UE Configuration Update Procedure for 5G

In 5G system, the PCF 110 can initiate a UE configuration update procedure towards the terminal device 140 via the AMF 130 through an interface (i.e., N15 interface) between the AMF 130 and the PCF 110.

In this embodiment, when there is an update in the PLMN specific list of 3GPP DOES in the PCF 110, the PCF 110 can initiate the UE configuration update procedure to provide, e.g., by using a new IE, one or more uplink filters associated with the list to the terminal device 140 via the AMF 130 through said interface.

Figure 3:
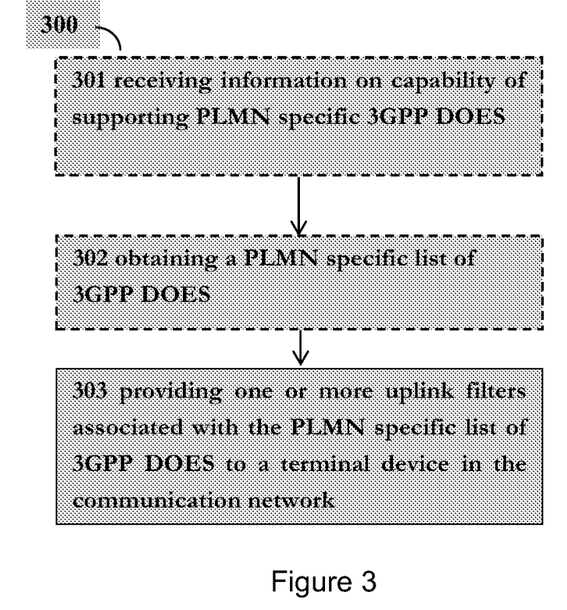
FIG. 3 illustrates flowchart of the method of the policy controlling device according to an embodiment of the present disclosure.

FIG. 3 illustrates a flowchart of a method 300 in the policy controlling device according to an embodiment of the present disclosure. The policy controlling device operates in a communication network (for example, the network 100 in FIG. 1) supporting 3GPP DOES. As an example rather than limitation, the policy controlling device may be a PCRF or a PCF. For ease of discussions, the method 300 will be described below with reference to the environment as described with reference to FIG. 1; however, it should be appreciated that embodiments of method 300 are not limited thereto and may be more widely applied.

At step 302, the policy controlling device 110 obtains a list of 3GPP DOES for a PLMN. The 3GPP DOES obtained at step 302 is PLMN specific. In an embodiment, the policy controlling device 110 may obtain the list of 3GPP DOES by being preconfigured with the list, for example by an administrator. In another embodiment, the pre-configuration of the list of 3GPP DOES may be in a Subscriber Profile Repository (SPR), a User Data Repository (UDR) or any other suitable repository connected to the policy controlling device 110, and from which the policy controlling device 110 fetches the list of 3GPP DOES. It can be appreciated that, if the policy controlling device 110 had already obtained the list, then the step 302 may be not needed.

At step 303, the policy controlling device 110 provides one or more uplink filters associated with the list of 3GPP DOES to a terminal device (for example, the terminal device 140 in FIG. 1). The step 303 may be implemented via one or more intermediate function nodes depending on the network architecture adopted by the communication network 100 and the situation where the method is applied. As described above with reference to FIGS. 2A-2D, the policy controlling device 110 may send the uplink filter(s) to the terminal device 140 via a session management device (120) and a mobility management device (130) during a registration procedure of the terminal device as schematically illustrated in FIGS. 2A-2B, and/or during a session establishment procedure initiated by the terminal device 140, and/or during a session modification procedure initiated by the policy controlling device 110 as shown schematically in FIGS. 2C-2D. In other embodiments, the policy controlling device 110 is a PCF, and the step 303 is implemented via an AMF through an interface between the PCF and the AMF during a registration procedure of the terminal device 140, and/or a UE configuration update procedure initiated by the PCF.

The one or more uplink filters is/are passed in a new container in an existing IE or a new IE by the session management device (120) and the mobility management device (130). Some examples for carrying the uplink filter(s) in a new container or a new IE of an existing signaling message have been described with reference to FIGS. 2A-2D and therefore details will be omitted here for simplicity.

As described above e.g. with respect to FIG. 2B, during the registration procedure and/or the session establishment procedure, the method may further comprise an optional step 301 of receiving information on capability of supporting PLMN specific 3GPP DOES of the terminal device 140, the mobility management device 130 and the session management device 120, and the step 303 may be performed only if the information indicates the terminal device 140, the mobility management device 130 and the session management device 120 all support PLMN specific 3GPP DOES. It can be appreciated that, the optional step 301 can also occur after the step 302 and before the step 303.

Figure 4:
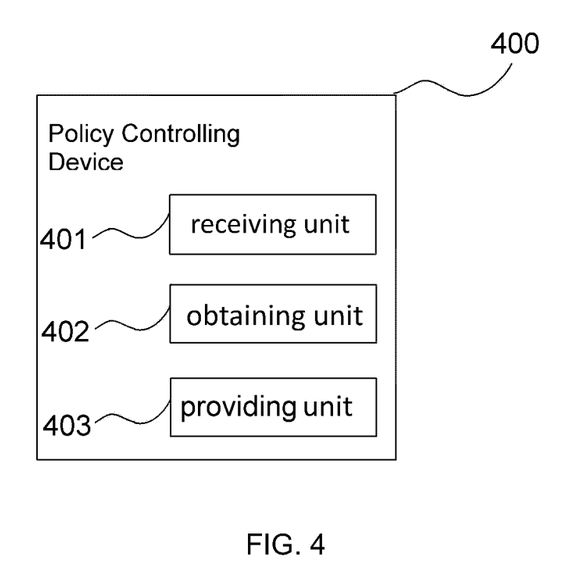
FIG. 4 illustrates a schematic block diagram of the policy controlling device according to an embodiment of the present disclosure.

FIG. 4 illustrates a schematic block diagram of the policy controlling device 400 according to an embodiment of the present disclosure. The policy controlling device 400 may include an obtaining unit 402 configured to obtain a PLMN specific list of 3GPP DOES, and a providing unit 403 configured to provide one or more uplink filters associated with the PLMN specific list of 3GPP DOES to a terminal device.

In an embodiment, the policy controlling device 400 may further include a receiving unit 401 configured to receive information on capability of supporting PLMN specific 3GPP DOES of the terminal device 140, the mobility management device 130 and the session management device 120 for determining whether to provide the uplink filter(s) to the terminal device or not.

It can be appreciated that, the policy controlling device 400 described herein may be implemented by various units, so that the policy controlling device 400 implementing one or more functions of the policy controlling device described with the embodiments may comprise not only the units 401, 402 and 403, but also other units for implementing one or more functions of the policy controlling device described with the embodiments. In addition, the policy controlling device 400 may comprise separate units for each separate function, or a single unit may be configured to perform two or more functions. Moreover, the units may be implemented in hardware, firmware, software, or combinations thereof.

It is understood that blocks of the block diagrams and/or flowchart illustrations, and combinations of blocks in the block diagrams and/or flowchart illustrations, may be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Furthermore, the solution of the present disclosure may take the form of a computer program on a memory having computer-usable or computer-readable program code embodied in the medium for use by or in connection with an instruction execution system. In the context of this document, a memory may be any medium that may contain, store, or is adapted to communicate the program for use by or in connection with the instruction execution system, apparatus, or device.

Figure 5:
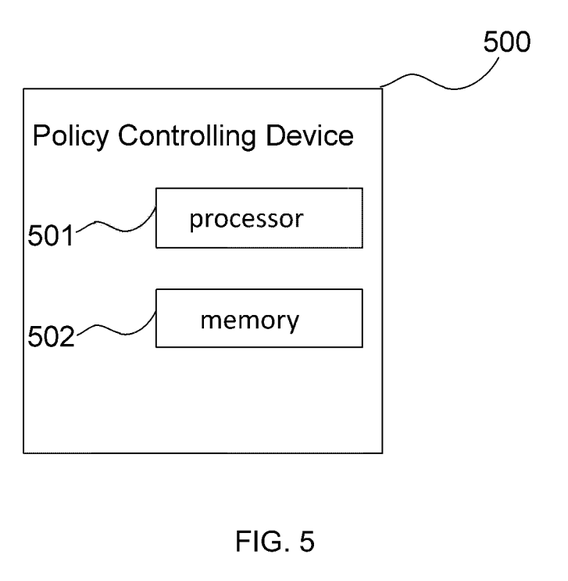
FIG. 5 illustrates another schematic block diagram of the policy controlling device according to an embodiment of the present disclosure.

Therefore, the present disclosure also provides a policy controlling device 500 including a processor 501 and a memory 502, as shown in FIG. 5. In the policy controlling device 500, the memory 502 stores instructions that when executed by the processor 501 cause the policy controlling device 500 to perform the method described above with the embodiments.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method of a policy controlling device in a communication network, for supporting Public Land Mobile Network (PLMN) specific 3GPP Data Off Exempt Services (DOES), the method comprising:
   the policy controlling device receiving information about a terminal device's capability of supporting PLMN specific 3GPP DOES;
   the policy controlling device providing, via a session management device and a mobility management device, one or more uplink filters associated with a PLMN specific list of 3GPP DOES to the terminal device in the communication network, wherein
   the policy controlling device is not a home subscriber server (HSS),
   the method further comprises receiving information on capability of supporting PLMN specific 3GPP DOES of the mobility management device and the session management device, and
   the providing is performed when the information about the terminal device's capability of supporting PLMN specific 3GPP DOES and the information about the capability of supporting the PLMN specific DOES of the mobility management device and the session management device indicate that the terminal device, the mobility management device, and the session management device all support PLMN specific 3GPP DOES.

2. The method of claim 1, wherein the method further comprises obtaining the list.

3. The method of claim 2, wherein said obtaining is implemented by configuration of the list in the policy controlling device or by fetching the list from a repository.

4. The method of claim 1, wherein said providing is implemented during one or more of:
   a registration procedure of the terminal device;
   a session establishment procedure initiated by the terminal device; and
   a session modification procedure initiated by the policy controlling device.

5. The method of claim 4, wherein
   the information about the terminal device's capability of supporting PLMN specific 3GPP DOES is received during the registration procedure and/or the session establishment procedure,
   the method further comprises receiving information on capability of supporting PLMN specific 3GPP DOES of the mobility management device and the session management device during the registration procedure and/or the session establishment procedure, and
   said providing is performed only if the information indicates the terminal device, the mobility management device and the session management device all support PLMN specific 3GPP DOES.

6. The method of claim 1, wherein the one or more uplink filters is/are passed in a new container in an existing Information Element (IE) or a new IE by the session management device and the mobility management device.

7. The method of claim 4, wherein the policy controlling device is a Policy Control and Routing Function (PCRF), the session management device comprises of a Serving Gateway (SGW) and a Packet Data Connection (PDN) Gateway (PGW), and the mobility management device is a Mobility Management Element (MME).

8. The method of claim 7, wherein the one or more uplink filters is/are provided in a new Attribute Value Pair (AVP) by the PCRF.

9. The method of claim 4, wherein the policy controlling device is a Policy Control Function (PCF), the session management device is a Session Management Function (SMF), and mobility management device is an Access and Management Function (AMF).

10. The method of claim 9, wherein the one or more uplink filters is/are provided in a new IE by the PCF.

11. The method of claim 1, wherein the policy controlling device is a PCF, and said providing is implemented via an AMF through an interface between the PCF and the AMF during one or more of:
    a registration procedure of the terminal device; and
    a UE configuration update procedure initiated by the PCF.

12. The method of claim 11, wherein the one or more uplink filters is/are provided in a new IE by the PCF and is passed in a new container in an existing IE or a new IE by the AMF.

13. The method of claim 1, wherein the policy controlling device is a PCRF or a PCF.

14. The method of claim 1, the method further comprising:
    the policy controlling device receiving information on capability of supporting PLMN specific 3GPP DOES.

15. The method of claim 14, wherein the policy controlling device receives the information on capability of supporting PLMN specific 3GPP DOES during a registration procedure of the terminal device and/or a session establishment procedure initiated by the terminal device.

16. A policy controlling device capable of supporting Public Land Mobile Network (PLMN) specific 3GPP Data Off Exempt Services (DOES), the device comprising:
    a processor;
    a receiver capable of receiving information about a terminal device's capability of supporting PLMN specific 3GPP DOES; and
    a memory, having stored instructions that when executed by the processor cause the policy controlling device to provide, via a session management device and a mobility management device, one or more uplink filters associated with a PLMN specific list of 3GPP DOES to the terminal device in the communication network, wherein
    the policy controlling device is not a home subscriber server (HSS),
    the device is configured to receive information on capability of supporting PLMN specific 3GPP DOES of the mobility management device and the session management device, and the providing is performed when the information about the terminal device's capability of supporting PLMN specific 3GPP DOES and the information about the capability of supporting the PLMN specific DOES of the mobility management device and the session management device indicate that the terminal device, the mobility management device, and the session management device all support PLMN specific 3GPP DOES.

* * * * *